US012696138B2

(12) United States Patent
Bhaskaran

(10) Patent No.: US 12,696,138 B2
(45) Date of Patent: Jul. 28, 2026

(54) PROVIDING SERVICES IN RADIO ACCESS NETWORKS SPECIFIC TO USER EQUIPMENTS

(71) Applicant: Rakuten Symphony, Inc., Tokyo (JP)

(72) Inventor: Sridhar Bhaskaran, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 699 days.

(21) Appl. No.: 18/000,707

(22) PCT Filed: Nov. 4, 2022

(86) PCT No.: PCT/US2022/048975
§ 371 (c)(1),
(2) Date: Dec. 5, 2022

(87) PCT Pub. No.: WO2024/096883
PCT Pub. Date: May 10, 2024

(65) Prior Publication Data
US 2024/0224123 A1 Jul. 4, 2024

(51) Int. Cl.
*H04W 28/18* (2009.01)
*H04W 76/19* (2018.01)
*H04W 76/30* (2018.01)

(52) U.S. Cl.
CPC ........... *H04W 28/18* (2013.01); *H04W 76/19* (2018.02); *H04W 76/30* (2018.02)

(58) Field of Classification Search
CPC ..... H04W 28/18; H04W 76/19; H04W 76/30; H04W 24/08; H04W 24/10; H04W 24/02; H04W 76/32

USPC ......................................................... 370/328
See application file for complete search history.

(56) References Cited

U.S. PATENT DOCUMENTS

| | | | |
|---|---|---|---|
| 2014/0226481 A1 | 8/2014 | Dahod et al. | |
| 2015/0282009 A1* | 10/2015 | Iwai ..................... | H04W 64/00 455/436 |
| 2018/0317218 A1 | 11/2018 | Li et al. | |
| 2019/0253917 A1* | 8/2019 | Dao ..................... | H04W 76/27 |

(Continued)

FOREIGN PATENT DOCUMENTS

| | | |
|---|---|---|
| EP | 2 905 981 B1 | 5/2019 |
| WO | 2014/054237 A1 | 4/2014 |
| WO | WO-2018141953 A1 | 8/2018 |

OTHER PUBLICATIONS

3GPP TS 23.401, "Technical Specification Group Services and System Aspects; General Packet Radio Service (GPRS) enhancements for Evolved Universal Terrestrial Radio Access Network (E-UTRAN) access (Release 17)," Jun. 2022.

(Continued)

*Primary Examiner* — Chandrahas B Patel
*Assistant Examiner* — Meheret Woldegebreal Kidane
(74) *Attorney, Agent, or Firm* — Sughrue Mion, PLLC

(57) ABSTRACT

In general, the current subject matter relates to providing services in radio access networks specific to user equipments. In some implementations, usage information uniquely associated with a user equipment (UE) having a UE context can be received at a core network from a radio access network (RAN). The usage information can have been gathered by the RAN. The received usage information can be stored at the core network after the UE context has been released.

20 Claims, 14 Drawing Sheets

(56) References Cited

U.S. PATENT DOCUMENTS

| | | | | |
|---|---|---|---|---|
| 2020/0100319 A1* | 3/2020 | Talebi Fard | .......... | H04W 76/32 |
| 2020/0314955 A1* | 10/2020 | Velev | .................... | H04W 76/11 |
| 2021/0099367 A1* | 4/2021 | Han | ...................... | H04L 43/026 |
| 2022/0030495 A1 | 1/2022 | Qiao et al. | | |
| 2022/0116810 A1* | 4/2022 | Rugeland | .......... | H04W 28/0278 |
| 2025/0024288 A1* | 1/2025 | Xu | ........................ | H04W 24/08 |
| 2025/0056270 A1* | 2/2025 | Salkintzis | ............. | H04W 76/15 |

OTHER PUBLICATIONS

3GPP TS 23.501, "Technical Specification Group Services and System Aspects; System architecture for the 5G System (5GS); Stage 2 (Release 17)," Jun. 2022.
3GPP TS 29.244, "Technical Specification Group Core Network and Terminals; Interface between the Control Place and the User Plane Nodes; Stage 3 (Release 17)," Jun. 2022.
3GPP TS 29.274, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 17)," Jun. 2022.
3GPP TS 29.501, "Technical Specification Group Core Network and Terminals; 5G System; Principles and Guidelines for Services Definition; Stage 3 (Release 17)," Sep. 2022.
3GPP TS 29.502, "Technical Specification Group Core Network and Terminals; 5G System; Session Management Services; Stage 3 (Release 17)," Jun. 2022.
3GPP TS 36.413, "Technical Specification Group Radio Access Network; Evolved Universal Terrestrial Radio Access Network (E-UTRAN); S1 Application Protocol (S1AP); (Release 17)," Jun. 2022.
3GPP TS 38.413, "Technical Specification Group Radio Access Network; NG-RAN; NG Application Protocol (NGAP); (Release 17)," Jun. 2022.
Marcin Dryjanski, "O-RAN Non-RT RIC: Architecture and rApps," Rimedo Labs, December 1, 2021, available at <https://rimedolabs.com/blog/o-ran-non-rt-ric-architecture-and-apps/>.
International Search Report and Written Opinion for International Patent Application No. PCT/US2022/048975 mailed Mar. 9, 2023.

\* cited by examiner

FIG. 1c.

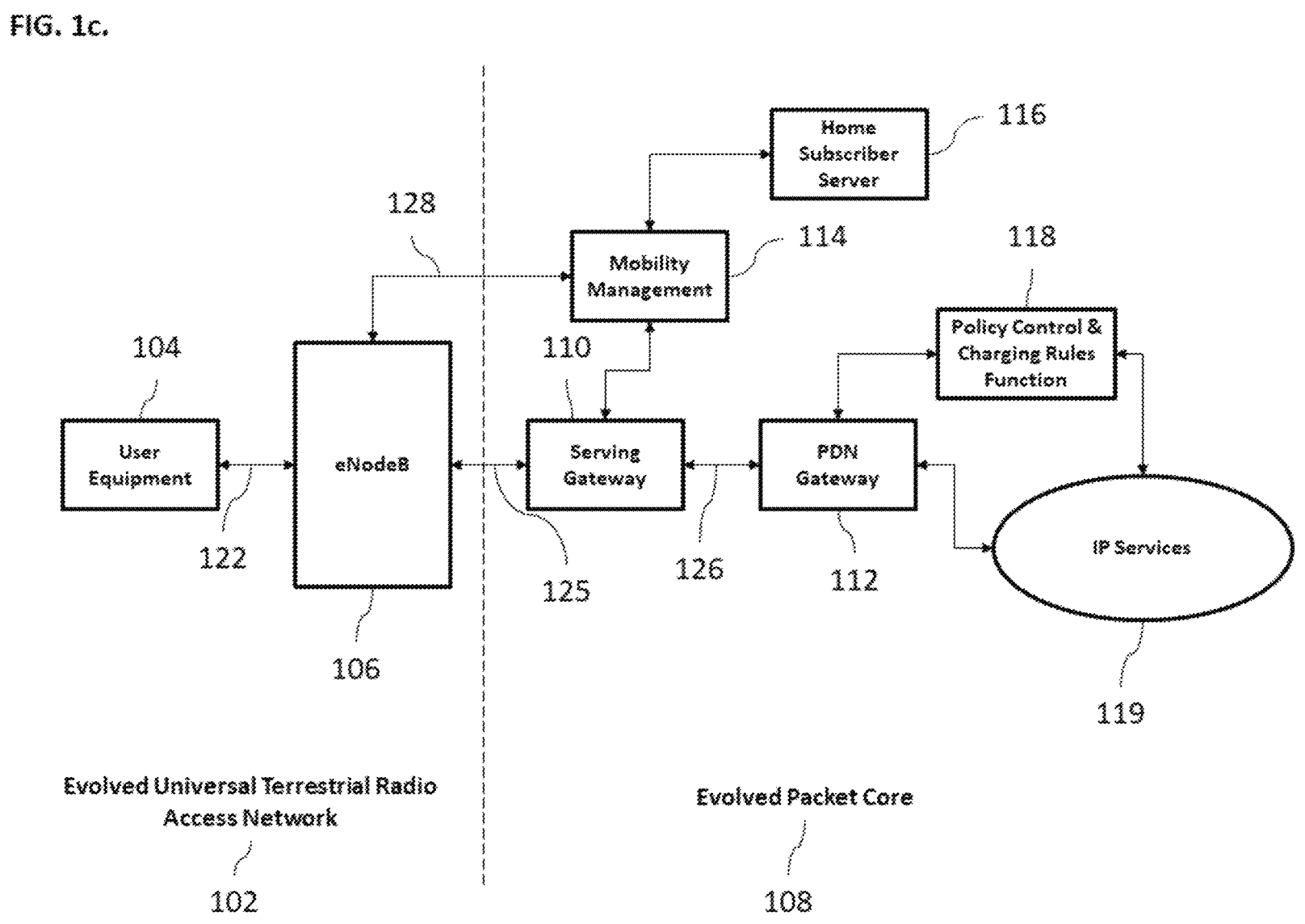

Home Subscriber Server — 116

Policy Control & Charging Rules Function — 118

IP Services — 119

PDN Gateway — 112

Mobility Management — 114

Serving Gateway — 110

126

125

128 eNodeB — 106

User Equipment — 104

122

Evolved Packet Core — 108

Evolved Universal Terrestrial Radio Access Network — 102

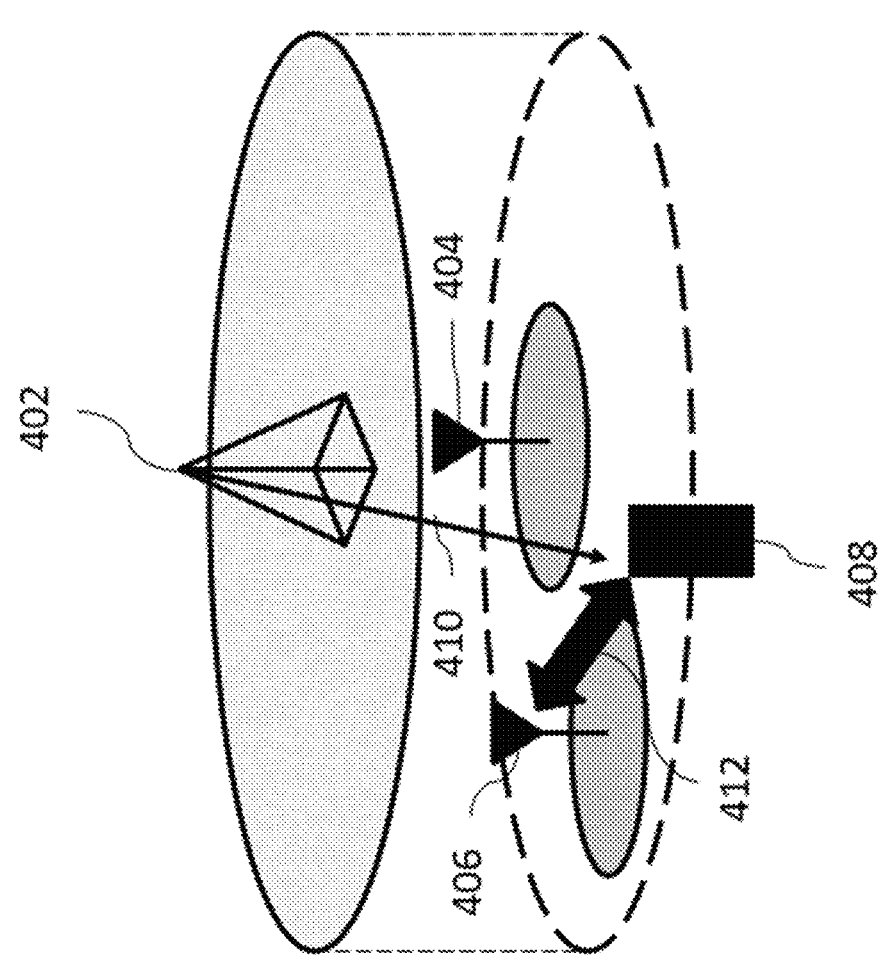
FIG. 4.

FIG. 8.

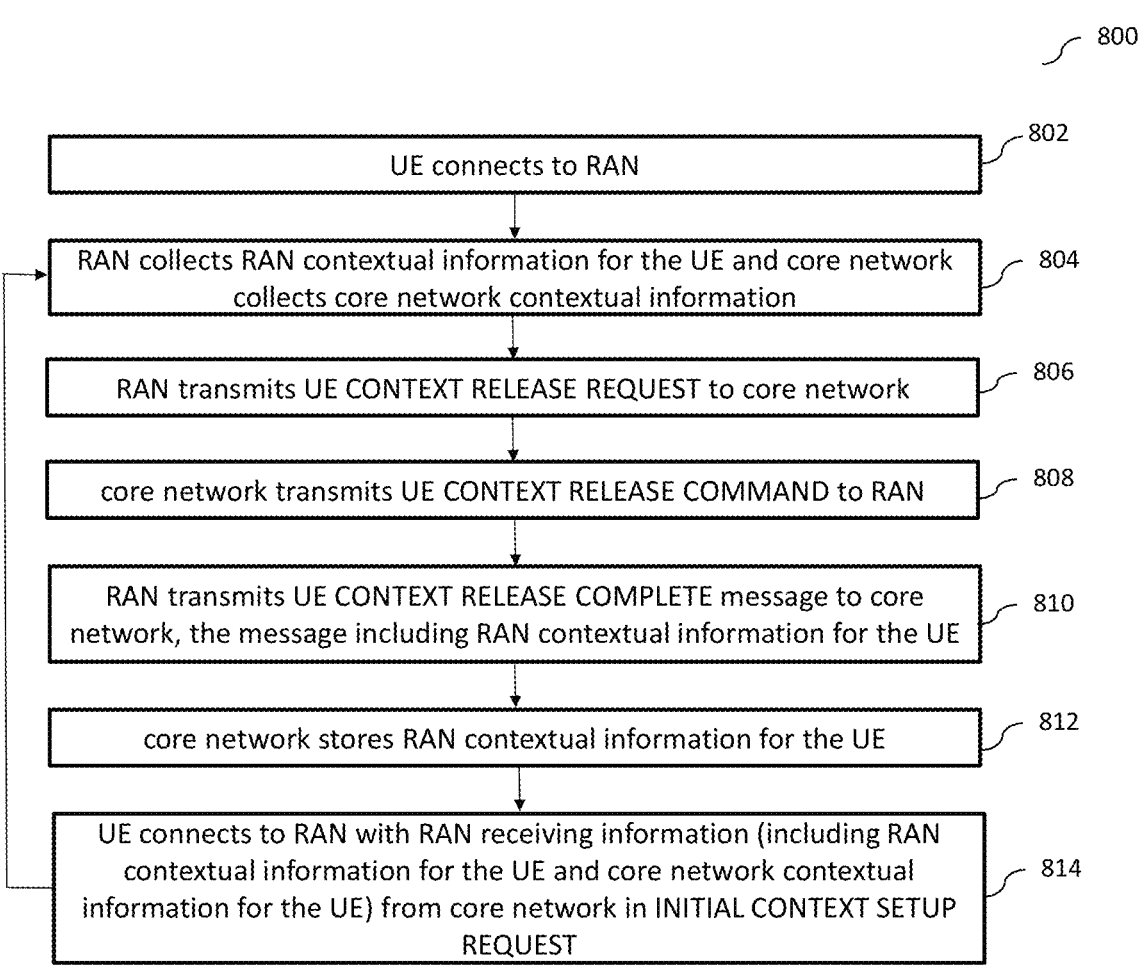

800

UE connects to RAN ⟋ 802

RAN collects RAN contextual information for the UE and core network collects core network contextual information ⟋ 804

RAN transmits UE CONTEXT RELEASE REQUEST to core network ⟋ 806 core network transmits UE CONTEXT RELEASE COMMAND to RAN ⟋ 808

RAN transmits UE CONTEXT RELEASE COMPLETE message to core network, the message including RAN contextual information for the UE ⟋ 810 core network stores RAN contextual information for the UE ⟋ 812

UE connects to RAN with RAN receiving information (including RAN contextual information for the UE and core network contextual information for the UE) from core network in INITIAL CONTEXT SETUP REQUEST ⟋ 814

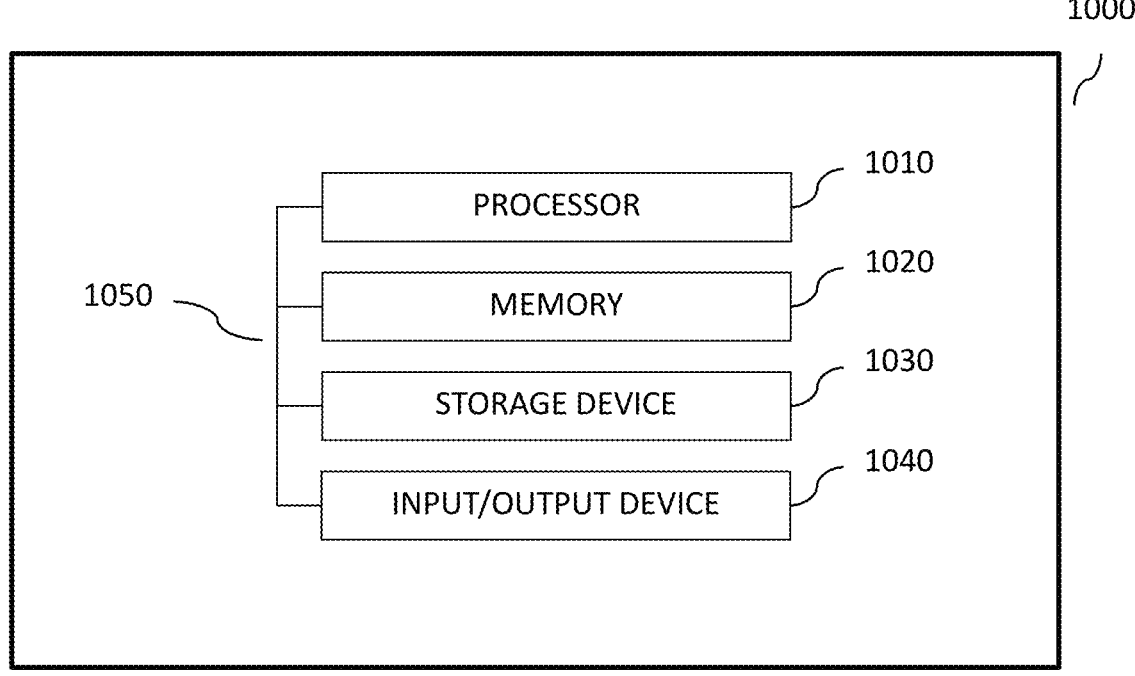

1050

PROCESSOR — 1010

MEMORY — 1020

STORAGE DEVICE — 1030

INPUT/OUTPUT DEVICE — 1040

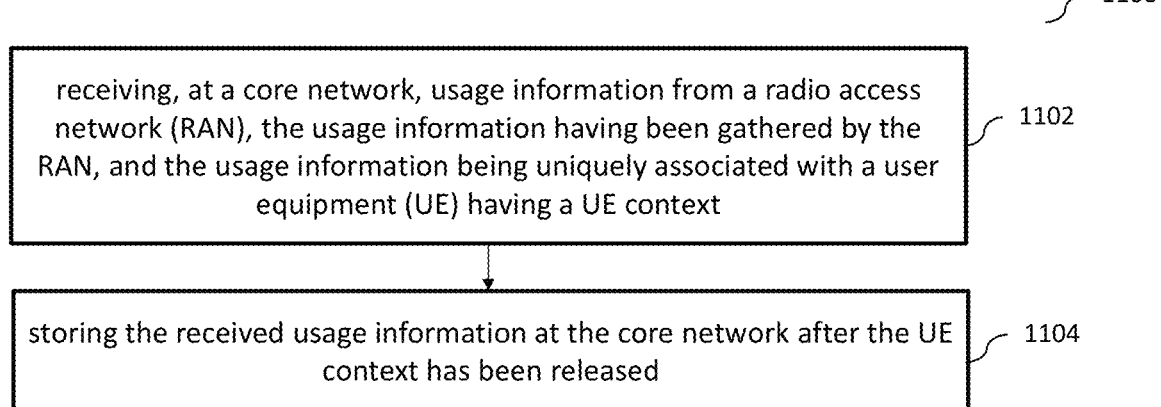

receiving, at a core network, usage information from a radio access network (RAN), the usage information having been gathered by the RAN, and the usage information being uniquely associated with a user equipment (UE) having a UE context — 1102 storing the received usage information at the core network after the UE context has been released — 1104

PROVIDING SERVICES IN RADIO ACCESS NETWORKS SPECIFIC TO USER EQUIPMENTS

CROSS-REFERENCE TO RELATED APPLICATIONS

The present application claims priority to and is the 35 U.S.C. 371 United States National Phase application based on International Patent Application No. PCT/US22/48975, filed on Nov. 4, 2022, entitled "PROVIDING SERVICES IN RADIO ACCESS NETWORKS SPECIFIC TO USER EQUIPMENTS," which is hereby incorporated by reference in its entirety.

TECHNICAL FIELD

In some implementations, the current subject matter relates to telecommunications systems, and in particular, to providing services in radio access networks specific to user equipments.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5GNR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

Each mobile telephone or other user equipment (UE) has a unique identifier, either an International Mobile Subscriber Identity (IMSI) for LTE systems or a Subscription Permanent Identifier (SUPI) for 5G systems. Under 3GPP standards, for security reasons, the unique identifier is allowed to be shared with the core network but not with the RAN. It can therefore be difficult, if not impossible, for the RAN to store and use information uniquely associated with a UE after the UE disconnects from the cellular network. The RAN may therefore not be able to optimally serve a particular UE even if the UE was previously connected to the RAN and has reconnected with the RAN.

SUMMARY

In some implementations, the current subject matter relates to a computer-implemented method. The method can include receiving, at a core network from a radio access network (RAN), usage information uniquely associated with a user equipment (UE) having a UE context. The usage information can have been gathered by the RAN. The method can also include storing the received usage information at the core network after the UE context has been released.

The method may allow, if the UE subsequently reconnects with the RAN, the core network to transmit the stored usage information for the UE to the RAN. Thus, from an outset of the UE's reconnection with the RAN, the RAN can have access to usage information uniquely associated with the UE, which may improve the RAN's service to the UE.

In some implementations, the current subject matter can include one or more of the following optional features.

In some implementations, the usage information can include one or more of the following parameters: Physical Downlink Control Channel (PDCCH) Control Channel Elements (CCE) allocation statistics for the UE, Block Error Rate (BLER) distribution for the UE, Modulation and Coding Scheme (MCS) distribution for the UE, uplink power allocation history based on Transmit Power Control (TPC) commands transmitted in association with the UE, Carrier Aggregation (CA) band combinations used in association with the UE, and Dual Connectivity (DC) band combinations used in association with the UE. Further, the method can also include transmitting an octet stream from the RAN to the core network with the usage information.

In some implementations, the usage information can be transmitted from the RAN to the core network in a UE CONTEXT RELEASE COMPLETE message.

In some implementations, the method can further include, after the UE context has been released, transmitting the stored usage information from the core network to the RAN. Further, the RAN can be configured to use the received usage information to fine tune UE-specific scheduling behavior and CA and DC carrier addition strategy, the RAN can be configured to use the received information in one or more of: tuning proportionate fair scheduler alpha/beta parameters, adjusting UE-specific PDCCH search space, adjusting a CCE aggregation level, adjusting an uplink power allocation to start approximately from a power level last used by the RAN for the UE, adjusting an initial MCS and/or BLER target, and adjusting a connected mode Discontinuous Reception (DRX) configuration of the UE, and/or the core network can transmit the stored usage information to the RAN in an INITIAL CONTEXT SETUP MESSAGE associated with the UE reconnecting with the RAN.

In some implementations, the method can further include a User Plane Function (UPF) of the core network collecting per Quality of Service (QoS) flow average packet inter-arrival time information associated with the UE. Further, the method can also include the UPF transmitting the collected information to a Session Management Function (SMF) of the core network. Further, the UPF can transmit the collected information to the SMF in a Packet Forwarding Control Protocol (PFCP) Session Report Request message. Further, the method can further include the SMF transmitting the collected information to an Access and Mobility Management Function (AMF) of the core network. Further, the SMF can transmit the collected information to the AMF in an Update Session Management (SM) Context Response message. Further, the method can further include the AMF transmitting the collected information and the stored usage information to the RAN. Further, the AMF can transmit the collected information and the stored usage information in an INITIAL CONTEXT SETUP MESSAGE to the RAN, and/or the AMF can also transmit one or more of the following to the RAN: per QoS flow uplink and downlink volume and per QoS flow uplink and downlink flow time.

In some implementations, the core network can store the usage information in connection with a unique identifier of the UE, and the unique identifier can be either an International Mobile Subscriber Identity (IMSI) or a Subscription Permanent Identifier (SUPI).

In some implementations, the RAN can include a base station that includes an eNodeB, and the core network can be a core network of an LTE system.

In some implementations, the RAN can include a base station that includes a gNodeB, and the core network can be a core network of a 5G system or a next generation system after 5G.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 4 illustrates an exemplary 3GPP split architecture to provide its users with use of higher frequency bands;

FIG. 7 illustrates another exemplary LTE wireless communication system, according to some implementations of the current subject matter;

FIG. 8 illustrates an exemplary method, according to some implementations of the current subject matter;

FIG. 10 illustrates another exemplary system, according to some implementations of the current subject matter; and FIG. 11 illustrates another exemplary method, according to some implementations of the current subject matter.

DETAILED DESCRIPTION

Figure 1A:
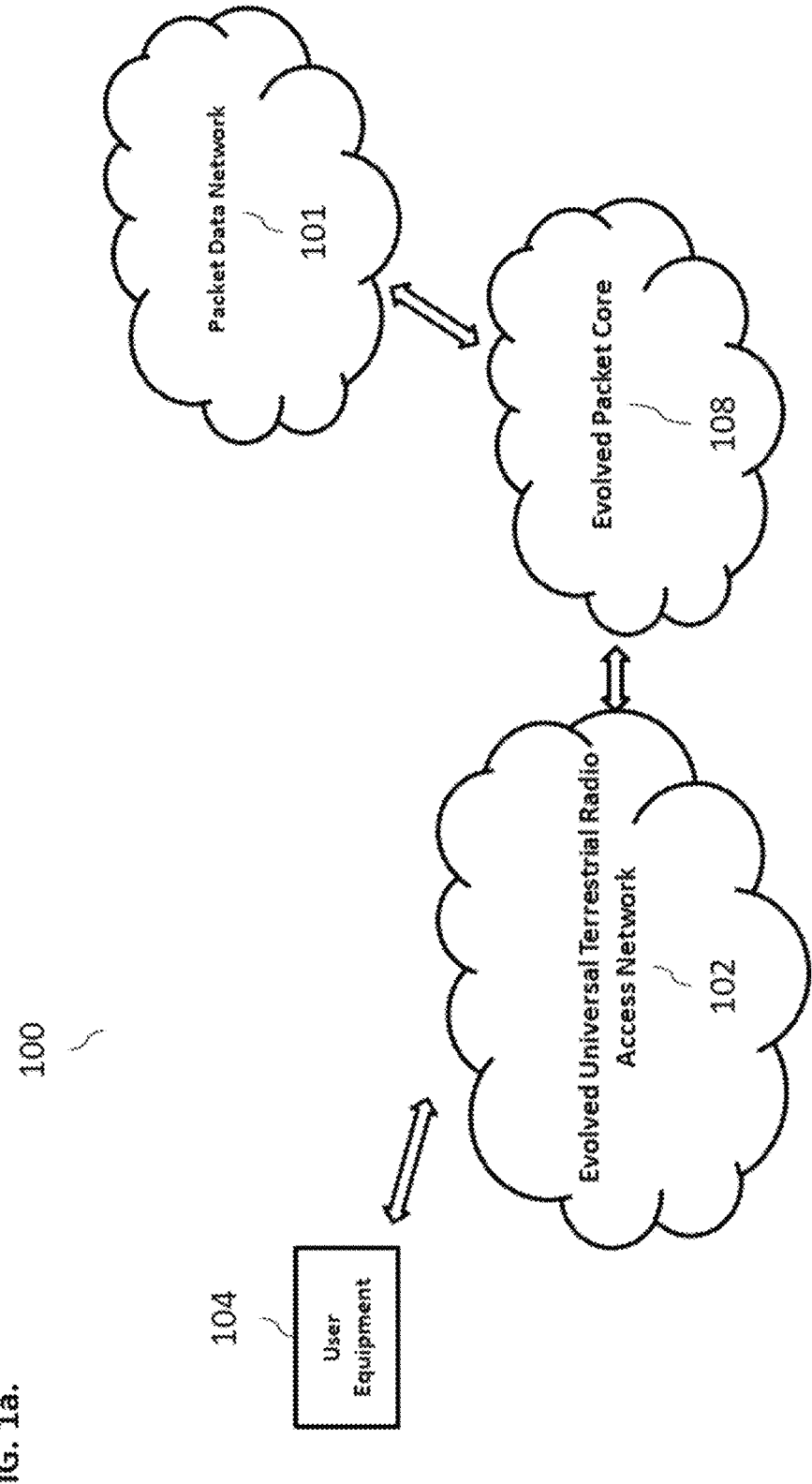
FIG. 1a illustrates an exemplary conventional long term evolution ("LTE") communications system.

The current subject matter can provide for systems and methods that can be implemented in wireless communications systems. Such systems can include various wireless communications systems, including 5G New Radio communications systems, long term evolution communication systems, etc.

In general, the current subject matter relates to providing services in radio access networks specific to user equipments.

In some implementations of the current subject matter, a radio access network (RAN) can be configured to gather usage information uniquely associated with a user equipment (UE) communicatively coupled with the RAN. A core network, configured to be communicatively coupled with the RAN, can be configured to cause release of a UE context for the UE that is stored at the RAN. The RAN can be configured to transmit the gathered usage information to the core network in connection with the release of the UE context. The core network can be configured to store the usage information received from the RAN. The usage information uniquely associated with a particular UE can thus be stored at the core network even after the UE context for the particular UE has been released at the RAN. If the UE subsequently reconnects with the RAN, the core network can be configured to transmit the stored usage information for the particular UE to the RAN. Thus, from an outset of the UE's reconnection with the RAN, the RAN can have access to usage information uniquely associated with the UE, which may improve the RAN's service to the UE. The usage information is also uniquely associated with the RAN, as it was previously gathered by the RAN, which may also improve the RAN's service to the UE.

In accordance with 3GPP standards, the core network can have access to a unique identifier of the UE, e.g., an identifier stored on the UE's Subscriber Identity Module (SIM) card such as an International Mobile Subscriber Identity (IMSI) for LTE systems or a Subscription Permanent Identifier (SUPI) for 5G systems. For security reasons, in accordance with 3GPP standards, the RAN cannot have access to the UE's unique identifier. Thus, in accordance with 3GPP standards, while the UE is connected with the RAN, the UE can be uniquely identified at the RAN with a temporary identifier, e.g., an S-Temporary Mobile Subscriber Identity (S-TMSI) for LTE systems or an S-Temporary Mobile Subscription Identifier (5G-S-TMSI) for 5G systems. The RAN therefore cannot store information uniquely associated with a particular UE after that UE's context has been released at the RAN, as the RAN no longer has an identifier to uniquely identify the UE. The RAN being configured to transmit usage information uniquely associated with a particular UE to the core network, and the core network being configured to store the received usage information, may allow the usage information for the particular UE to be saved even after the UE context has been released at the RAN. The core network can store the usage information in relation to the UE's unique identifier, even when the UE is in IDLE state, thereby allowing the usage information to remain uniquely associated with a particular UE and available for transmission back to the RAN in the event that the UE reconnects with the RAN.

3GPP standards defining one or more aspects related to the current subject matter include 3GPP TS 23.401 "General Packet Radio Service (GPRS) enhancements for Evolved Universal Terrestrial Radio Access Network (E-UTRAN) access," 3GPP TS 23.501 "System architecture for the 5G System (5GS); Stage 2," 3GPP TS 29.244 "Interface between the Control Plane and the User Plane Nodes; Stage 3," 3GPP TS 29.274 "3GPP Evolved Packet System (EPS); Evolved General Packet Radio Service (GPRS) Tunneling Protocol for Control plane (GTPv2-C); Stage 3," 3GPP TS 29.501 "5G System; Principles and Guidelines for Services Definition; Stage 3," 3GPP TS 29.502 "5G System; Session Management Services; Stage 3," 3GPP TS 36.413 "Evolved Universal Terrestrial Radio Access Network (E-UTRAN); S1 Application Protocol (S1AP)," and 3GPP TS 38.413 "NG-RAN; NG Application Protocol (NGAP)." Standards of the O-RAN Alliance may also be related to one or more aspects of the current subject matter, such as standards of Working Group 1 (WG1), the Use Cases and Overall Architecture workgroup.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

As shown in FIG. Ta, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. Tb) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

FIG. Tb illustrates further detail of the network 100 shown in FIG. Ta. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. Tb, the air interface 122 provides communication between user equipment 104b and the eNodeB 106*a*. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1*c*). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(*a, b, c*). As shown in FIG. 1*b*, X2 interface 130*a* provides interconnection between eNodeB 106*a* and eNodeB 106*b*; X2 interface 130*b* provides interconnection between eNodeB 106*a* and eNodeB 106*c*; and X2 interface 130*c* provides interconnection between eNodeB 106*b* and eNodeB 106*c*. The X2 interface can be established between two eNodeBs in order to provide an exchange of signals, which can include a load- or interference-related information as well as handover-related information. The eNodeBs 106 communicate with the evolved packet core 108 via an S1 interface 124(*a, b, c*). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

Figure 1B:
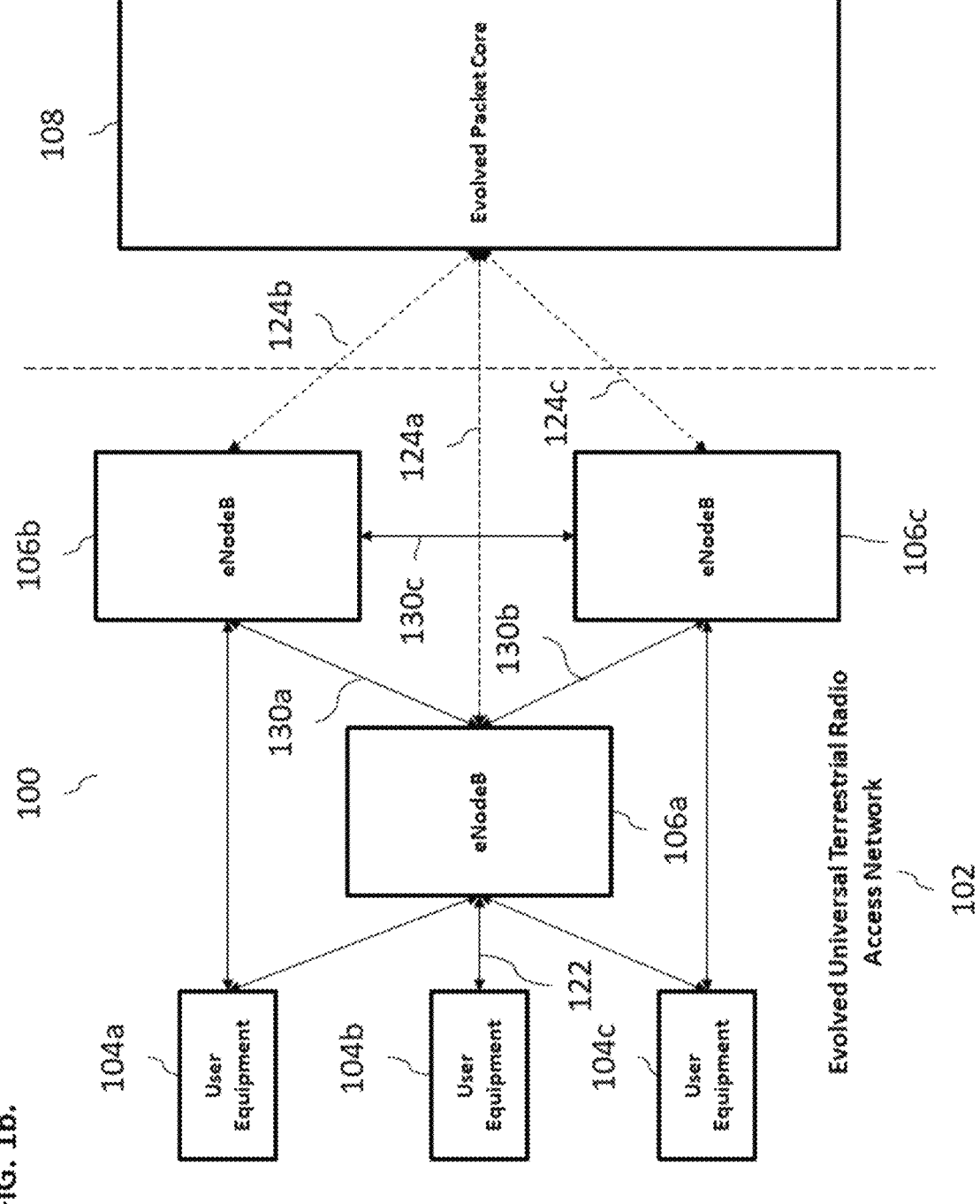

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
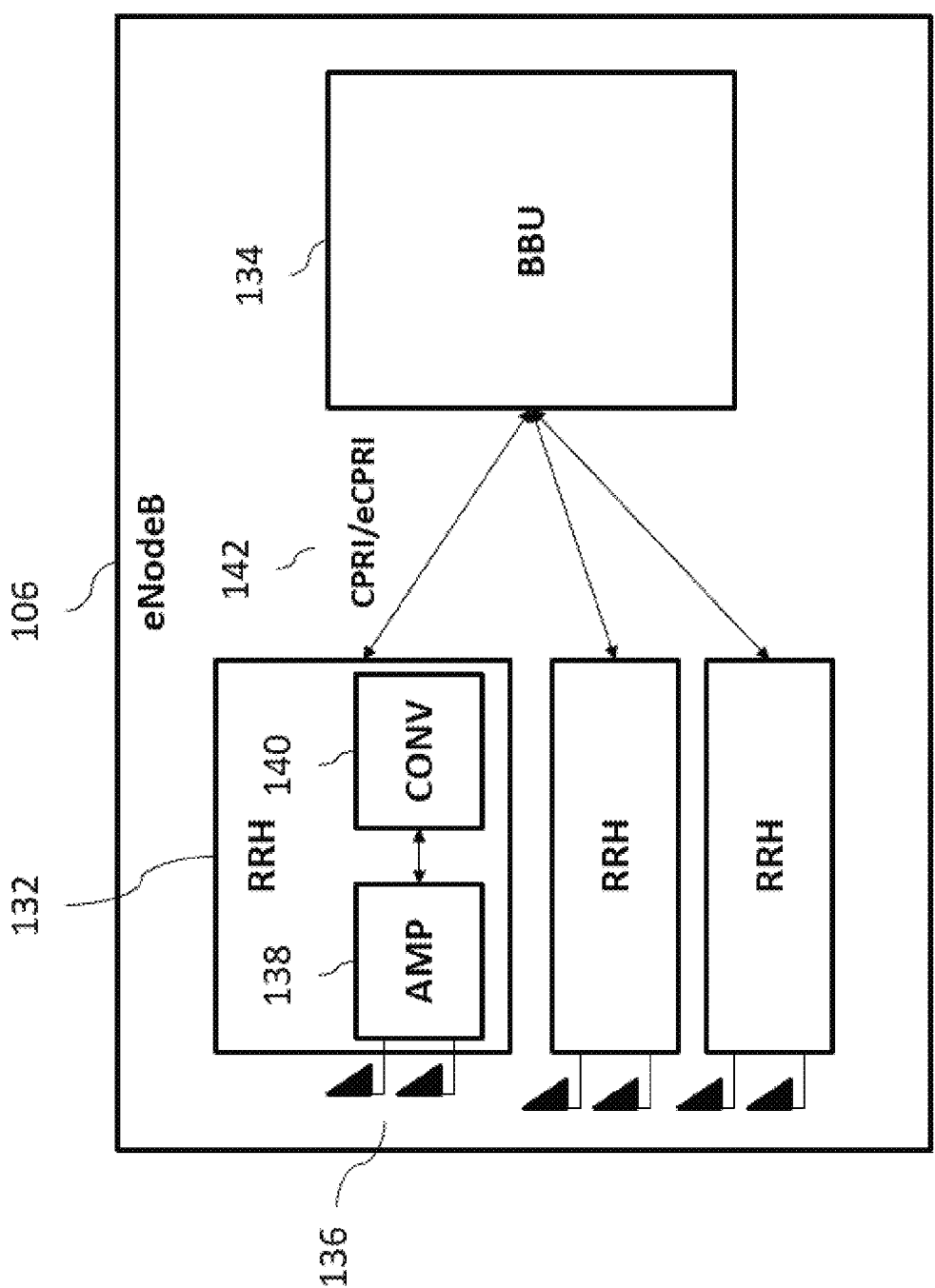

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
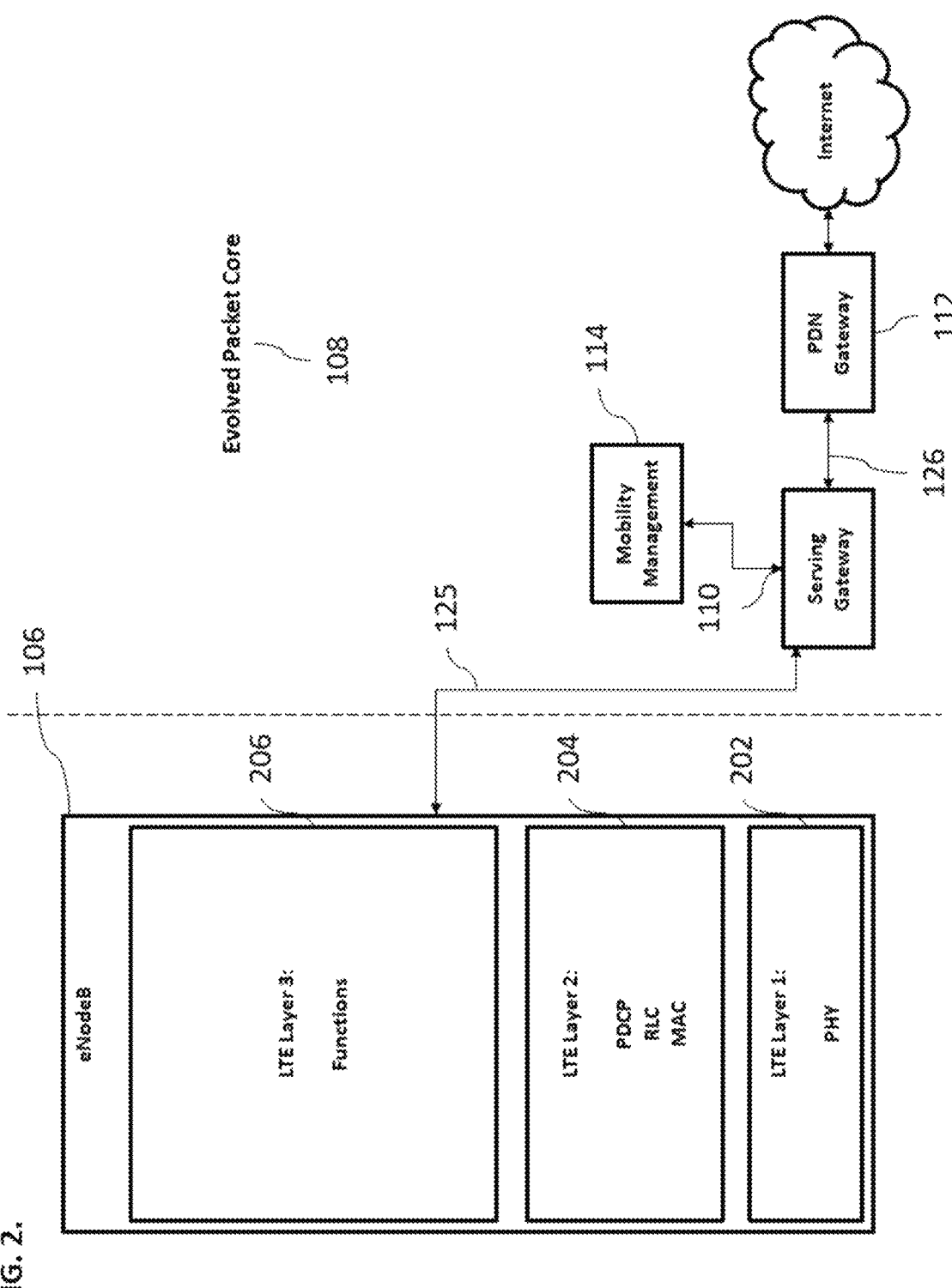
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
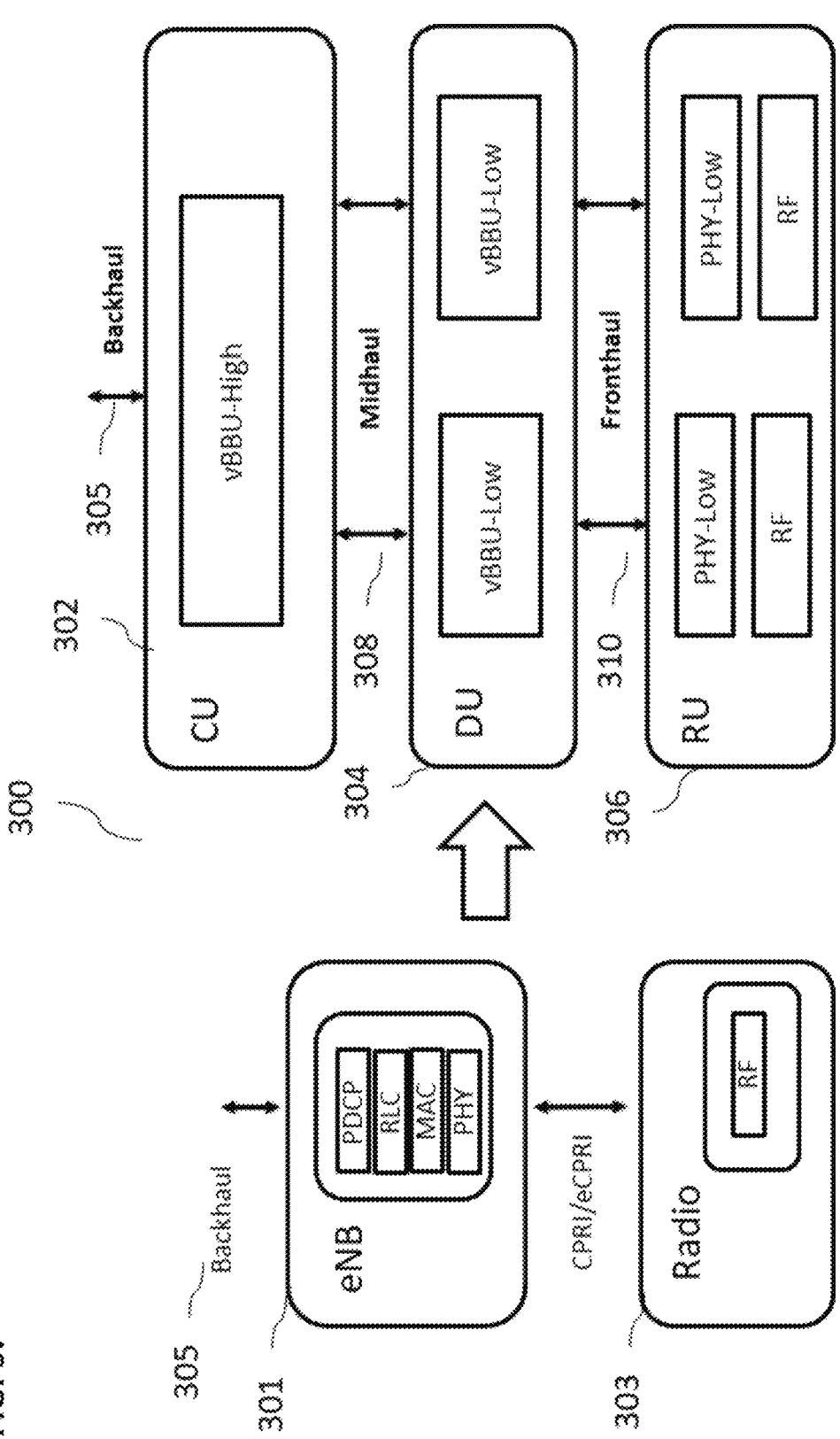
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 308. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404,

406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
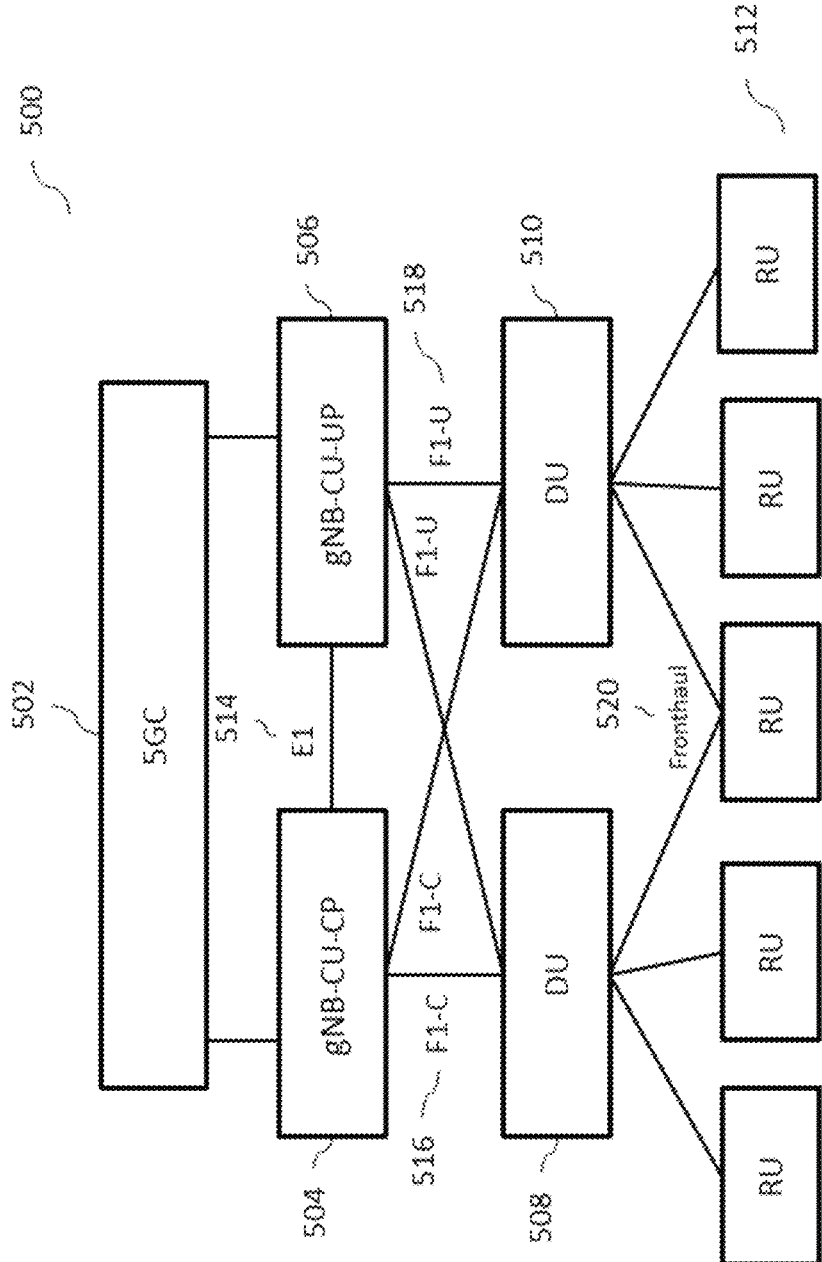
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
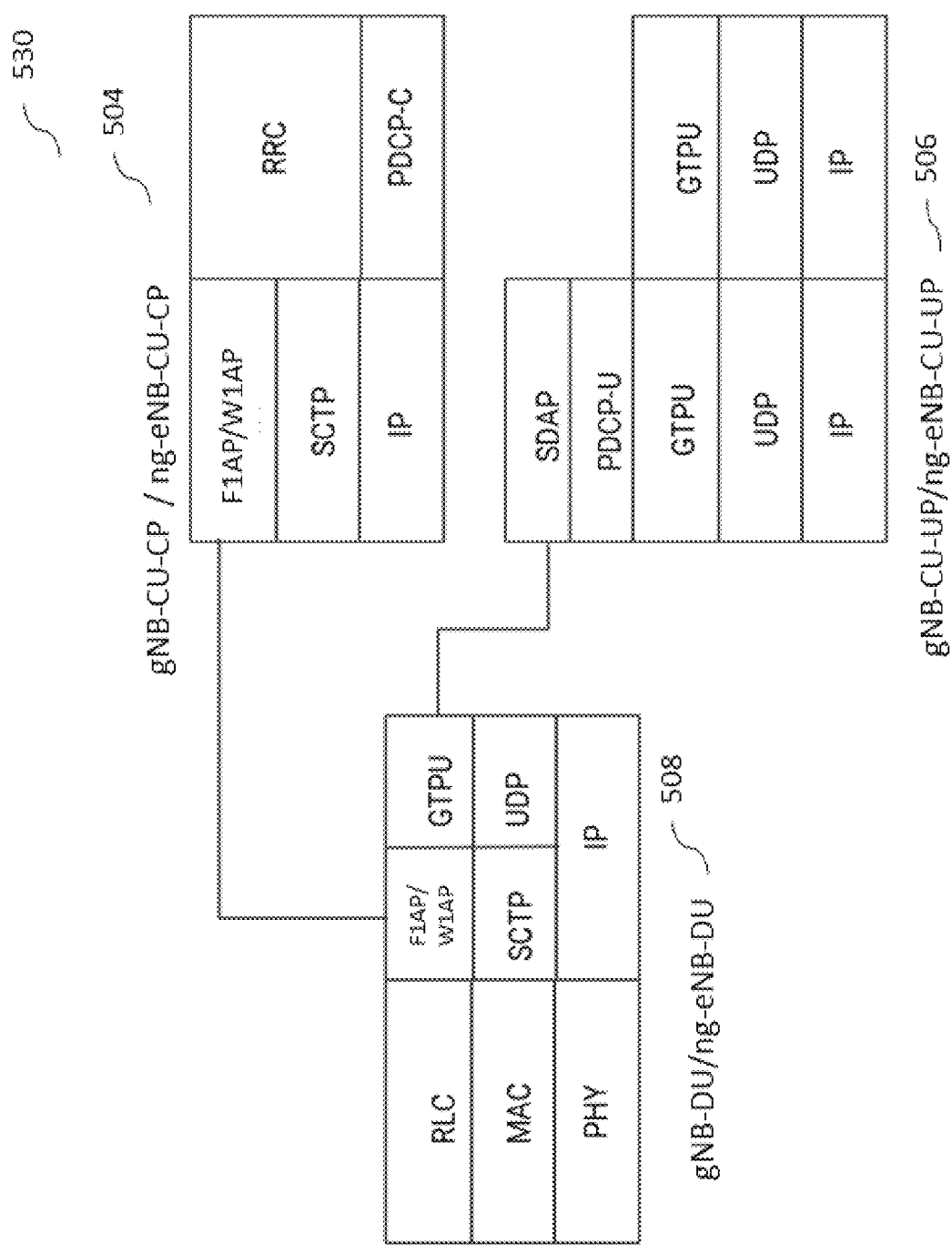
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
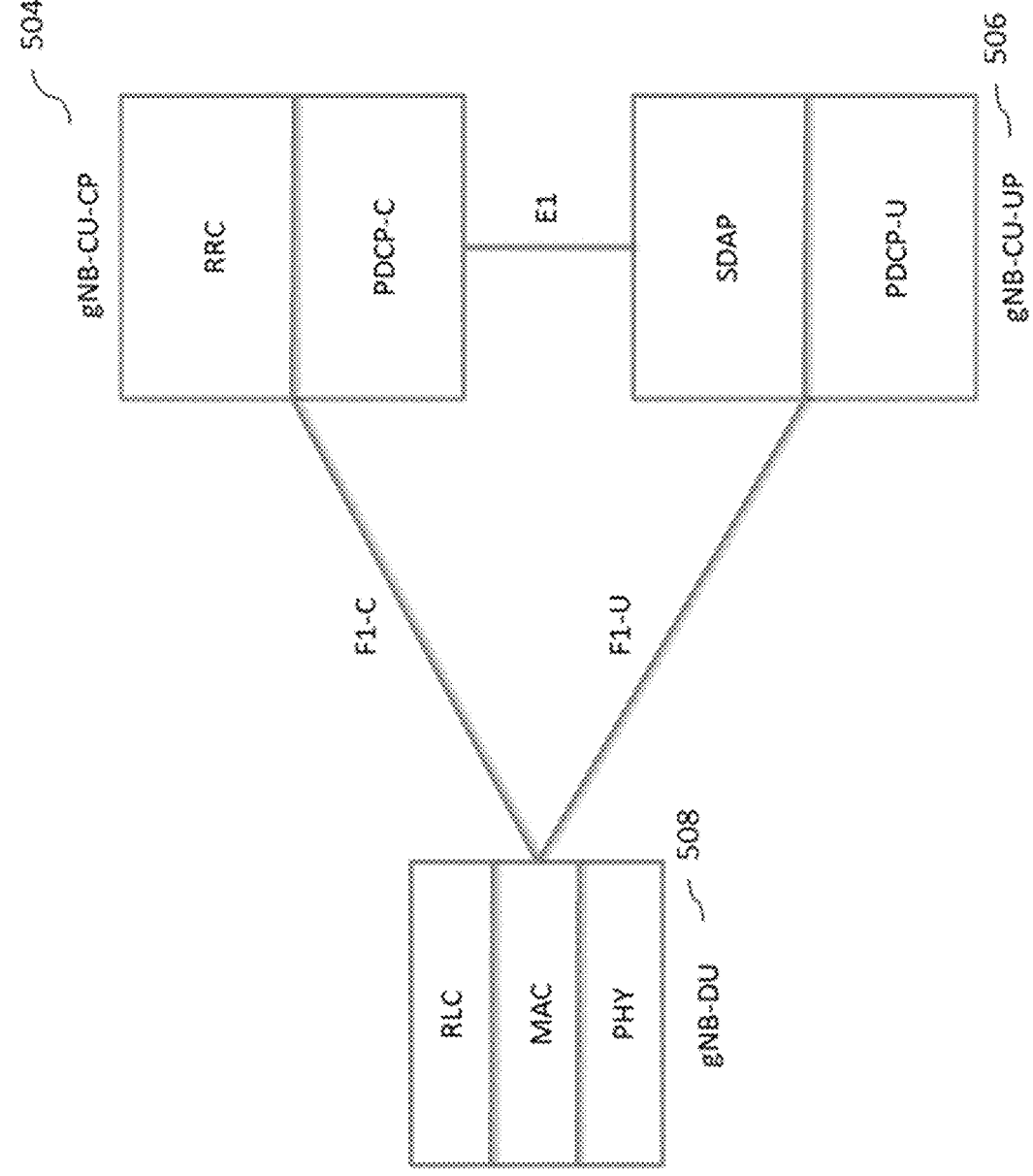
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5c). As shown in FIG. 5c, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Providing Services in Rans Specific to UEs

In some implementations of the current subject matter, a core network (e.g., a core network in an LTE system such as the EPC 108 of FIGS. 1a-1c and 2, a core network in a 5G system such as the core network 502 of FIG. 5a, or a core network in a 6G or later generation system) communicatively coupled with a radio access network (RAN) (e.g., a RAN in an LTE system such as EUTRAN 102 of FIGS. 1a-1c, a RAN in a 5G system such as RAN 300 of FIG. 3, or a RAN in a 6G or later generation system) can be configured to cause a user equipment (UE) context for a particular UE (e.g., UE 104 of FIGS. 1*a*-1*c*, UE 408 of FIG. 4, etc.) to be established at the RAN. The UE context can be established in accordance with 3GPP standards. The UE can have a unique identifier, e.g., an identifier stored on the UE's SIM card such as an IMSI for LTE systems or a SUPI for 5G systems. However, for security reasons, in accordance with 3GPP standards, the UE's unique identifier is known to the core network but not to the RAN. Thus, in accordance with 3GPP standards, the UE connected to the RAN is uniquely identified at the RAN with a temporary identifier, e.g., an S-TMSI in LTE systems or a 5G-S-TMSI for 5G systems.

In some implementations of the current subject matter, the RAN can be configured to gather usage information uniquely associated with the UE connected thereto. The RAN can be configured to store the gathered information in unique association with the UE, such as by storing the gathered information in relation to the UE's temporary identifier. Usage information gathered by the RAN in association with a particular UE is also referred to herein as "RAN contextual information."

The core network can be configured to cause release of the UE context, e.g., when the UE is to be transitioned to IDLE, in accordance with 3GPP standards. The RAN can be configured to transmit the usage information associated with the UE to the core network in connection with the release of the UE context. The RAN can be configured to transmit the usage information as being uniquely associated with the UE, such as by associating the usage information with the temporary identifier.

The core network can be configured to store the usage information received from the RAN, even with the UE in IDLE state. The core network can be configured to identify the usage information as being uniquely associated with the particular UE, e.g., using the temporary identifier received from the RAN in association with the usage information. The core network therefore store the received usage information in unique association with the UE, such as by storing the received usage information in relation to the UE's unique identifier known to the core network. The usage information uniquely associated with a particular UE can thus be stored at the core network even after the UE context for the particular UE has been released at the RAN, and the UE's unique identifier can remain unknown to the RAN and therefore not jeopardize security.

If the UE subsequently reconnects with the RAN, the core network can be configured to transmit the stored usage information for the particular UE to the RAN. Thus, from an outset of the UE's reconnection with the RAN, the RAN can have access to usage information uniquely associated with the UE, which may improve the RAN's service to the UE. The usage information is also uniquely associated with the RAN, as it was previously gathered by the RAN, which may also improve the RAN's service to the UE.

The RAN can be configured to use the usage information gathered by the RAN in association with a particular UE and subsequently received back from the core network when the particular UE reconnects with the RAN, which may improve service to the reconnected UE. In general, the improved service may result from the RAN using the usage information to fine tune UE specific scheduling and radio resource management (RRM) behavior.

Various usage information associated with a particular UE connected to the RAN can be gathered by the RAN. In general, the usage information can include UE-specific usage statistics and a UE-specific usage profile.

In some implementations of the current subject matter, the usage information can include one or more of the following parameters: Physical Downlink Control Channel (PDCCH) Control Channel Elements (CCE) allocation statistics for the UE, Block Error Rate (BLER) distribution for the UE, Modulation and Coding Scheme (MCS) distribution for the UE, uplink power allocation history based on Transmit Power Control (TPC) commands transmitted in association with the UE, Carrier Aggregation (CA) band combinations used in association with the UE, and Dual Connectivity (DC) band combinations used in association with the UE.

The RAN can be configured to adjust UE-specific PDCCH search space based on PDCCH CCE allocation statistics for the UE. In other words, based on the UE's historical PDCCH CCE allocation statistics, the RAN can be configured to adjust PDCCH search space specific for the UE.

The RAN can be configured to adjust the UE's CCE aggregation level based on PDCCH CCE allocation statistics for the UE. In other words, based on the UE's historical PDCCH CCE allocation statistics, the RAN can be configured to adjust the UE's CCE aggregation level.

The RAN can be configured to adjust the connected mode Discontinuous Reception (DRX) configuration of the UE based on PDCCH CCE allocation statistics for the UE. In other words, based on the UE's historical PDCCH CCE allocation statistics, the RAN can be configured to adjust the UE's connected mode DRX configuration.

The RAN can be configured to adjust the initial MCS target for the UE based on the MCS distribution for the UE. In other words, based on the UE's historical MCS distribution, the RAN can be configured to adjust the UE's initial MCS target.

The RAN can be configured to adjust the initial BLER target for the UE based on the BLER distribution rate for the UE. In other words, based on the UE's historical BLER distribution rate, the RAN can be configured to adjust the UE's initial BLER target.

The RAN can be configured to adjust the UE's uplink power allocation based on the uplink power allocation history using the TPC commands transmitted in association with the UE. In other words, based on the UE's historical uplink power allocation, the RAN can be configured to adjust the UE's uplink power allocation. The adjustment of the UE's uplink power allocation may allow the uplink power allocation to start straight away from a power level closer to a power level last used by the UE, e.g., when the UE was previously connected with the RAN, instead of gradually ramping up to the power level.

The RAN can be configured to tune secondary cell (SCell) addition strategy based on CA band combinations used in association with the UE. In other words, based on the UE's historical CA band combination usage, the RAN can be configured to tune the UE's SCell addition strategy. Tuning the UE's SCell addition strategy can include Event A1 (triggered when serving a cell becomes better than a threshold) based SCell addition or blind SCell addition.

The RAN can be configured to tune secondary node (e.g., SgNB, etc.) addition strategy based on DC band combinations used in association with the UE. In other words, based on the UE's historical DC band combination usage, the RAN can be configured to tune the UE's secondary node addition strategy. Tuning the UE's secondary node addition strategy can include Event A1 (triggered when serving a cell becomes better than a threshold) based SCell addition or blind sequence number (SN) addition.

In some implementations of the current subject matter, the core network can be configured to gather information associated with a particular UE while the UE is connected with the RAN. The core network can also be configured store the gathered information at the core network in unique association with the UE, e.g., store the gathered information in the UE context. The core network can thus store information gathered by the core network and uniquely associated with a particular UE even after the UE context for the particular UE has been released at the RAN. Information gathered by the core network (CN) in association with a particular UE is also referred to herein as "core network contextual information."

If the UE subsequently reconnects with the RAN, the core network can be configured to transmit to the RAN the CN contextual information that was gathered by the core network during the UE's previous connection with the RAN. Thus, from an outset of the UE's reconnection with the RAN, the RAN can have access to information uniquely associated with the UE that was gathered by the core network, which may improve the RAN's service to the UE. The core network can be configured to transmit to the RAN the CN contextual information with the RAN contextual information also transmitted to the RAN from the core network.

Various information associated with a particular UE connected to the RAN can be gathered by the core network. In some implementations of the current subject matter, the UE-specific information gathered by the core network and stored at the core network (e.g., in the UE context) can include per QoS flow (5G QoS Identifiers (5QI)/QoS Class Identifiers (QCI)) average downlink and uplink packet size, per QoS flow (5QI/QCI) average downlink and uplink packet inter arrival interval, and time of day based traffic usage pattern related to QoS flow (5QI/QCI) average downlink and uplink packet size and per QoS flow (5QI/QCI) average downlink and uplink packet inter arrival interval.

The RAN can be configured to perform QCI/5QI specific scheduling alpha/beta tuning based on packet inter arrival times and volume. In other words, based on the UE's historical QoS flow (5QI/QCI) packet inter arrival times and volume, the RAN can be configured to perform QCI/5QI specific scheduling alpha/beta tuning for the UE. The QCI/5QI specific scheduling alpha/beta tuning for the UE can include tuning proportionate fair scheduler alpha/beta parameters for the UE.

The RAN can be configured to perform UE admission control based on PDCCH CCE allocation statistics for the UE, MCS distribution for the UE, and the UE's time of day based traffic usage pattern. In other words, based on the UE's historical PDCCH aggregation levels, MCS distribution, and time of day based traffic usage pattern, the RAN can be configured to perform UE admission control. For example, if the UE historically used aggressive data and MCS distribution was such that it led to needing large number of physical resource blocks (PRBs) to meet the traffic demand, and if current cell load is not able to provide such large amount of PRBs consistently, then the UE need not be admitted.

In some implementations of the current subject matter, the UE's unique identifier, e.g., IMSI or SUPI, may be made available from the core network to an O-RAN non-real-time RAN intelligent controller (Non-RT RIC) or an O-RAN near-real-time RAN intelligent controller (Near-RT RIC). In such implementations, the RAN can be configured as described herein to gather and transmit RAN contextual information to the core network and to receive the RAN contextual information (and CN contextual information) from the core network.

In some implementations of the current subject matter, the RAN can be configured to transmit the usage information gathered in relation to a particular UE in a UE CONTEXT RELEASE COMPLETE message to the core network. The UE CONTEXT RELEASE COMPLETE message is defined by 3GPP. The usage information may thus be transmitted from the RAN to the core network using a message already transmitted from the RAN to the core network in accordance with 3GPP standards.

Figure 6:
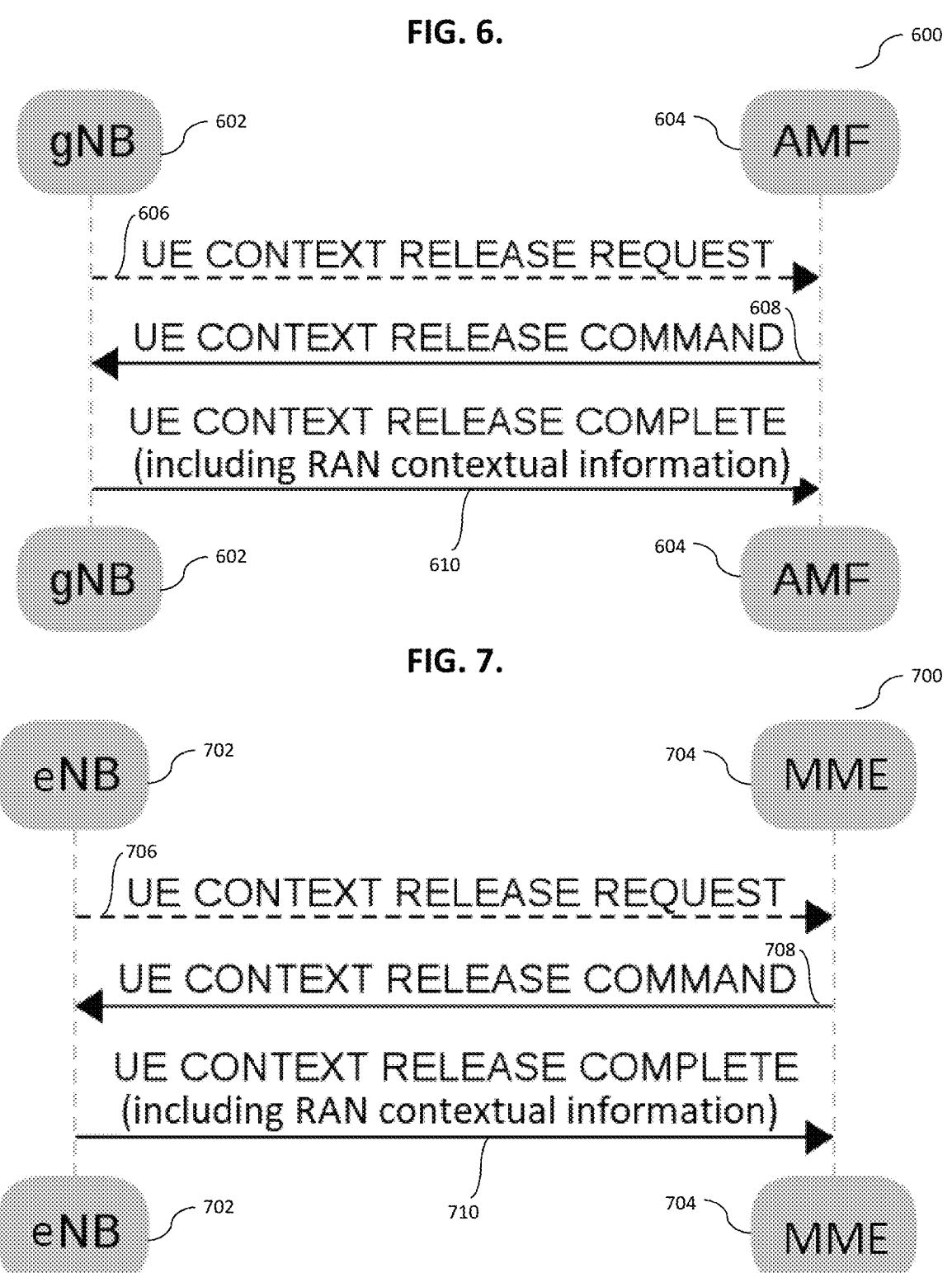
FIG. 6 illustrates another exemplary 5G wireless communication system, according to some implementations of the current subject matter.

FIG. 6 illustrates an exemplary system 600 including a RAN configured to transmit usage information to a core network, according to some implementations of the current subject matter. The system 600 of FIG. 6 is a 5G system. Thus, the RAN (e.g., the RAN of FIG. 3, etc.) includes a gNB 602 (e.g., the gNB of FIGS. 5a-5c, etc.), and the core network (e.g., the core network 502 of FIG. 5a, etc.) includes an Access and Mobility Management Function (AMF) 604.

As shown in the implementation of FIG. 6, the gNB 602 transmits 606 a UE CONTEXT RELEASE REQUEST to the AMF 604 in association with a particular UE, in accordance with 3GPP standards. Subsequently, in reply, the AMF 604 transmits 608 a UE CONTEXT RELEASE COMMAND to the gNB 602 in association with the particular UE, in accordance with 3GPP standards. Subsequently, in reply, the gNB 602 transmits 610 a UE CONTEXT RELEASE COMMAND to the AMF 604 in association with the particular UE. The UE CONTEXT RELEASE COMMAND is transmitted 610 in accordance with 3GPP standards except that the UE CONTEXT RELEASE COMMAND also includes RAN contextual information gathered by the RAN. The core network can be configured to later transmit the usage information back to the RAN in relation to the UE reconnecting with the RAN, as described herein.

The system 600 of FIG. 6 can be implemented similarly in a 6G or later generation system with a RAN transmitting usage information to a 6G or later generation system's core network.

FIG. 7 illustrates another exemplary system 700 including a RAN configured to transmit usage information to a core network, according to some implementations of the current subject matter. The system 700 of FIG. 7 is an LTE system. Thus, the RAN (e.g., the EUTRAN 102 of FIGS. 1a-1c and 2, etc.) includes an eNB 702 (e.g., the eNBs 106 of FIGS. 1b-2, the eNB 301 of FIG. 3, etc.), and the core network (e.g., the EPC 108 of FIGS. 1a-1c and 2, etc.) includes a mobility management entity (MME) 704 (e.g., the MME 114 of FIGS. 1c and 2, etc.).

As shown in the implementation of FIG. 7, the eNB 702 transmits 706 a UE CONTEXT RELEASE REQUEST to the MME 704 in association with a particular UE, in accordance with 3GPP standards. Subsequently, in reply, the MME 704 transmits 708 a UE CONTEXT RELEASE COMMAND to the eNB 702 in association with the particular UE, in accordance with 3GPP standards. Subsequently, in reply, the eNB 702 transmits 710 a UE CONTEXT RELEASE COMMAND to the MME 704 in association with the particular UE. The UE CONTEXT RELEASE COMMAND is transmitted 710 in accordance with 3GPP standards except that the UE CONTEXT RELEASE COMMAND also includes RAN contextual information gathered by the RAN. The core network can be configured to later transmit the usage information back to the RAN in relation to the UE reconnecting with the RAN, as described herein.

In some implementations, the usage information can be transmitted 610, 710 to the core network as an octet string that is transparent to core network. The octet string can be an opaque binary blob, as the usage information is useful to and understandable by the RAN but is not useful to or understandable by the core network. The transmission 610, 710 of the usage information as an opaque binary blob may thus be useful to transfer any RAN vendor specific information to core network which the core network is not required to interpret.

FIG. 8 illustrates an exemplary method 800, according to some implementations of the current subject matter. The method 800 is described with respect to an exemplary system 900 illustrated in FIG. 9 for ease of explanation but can be implemented similarly with other systems. The system 900 of FIG. 9 is a 5G system, but as mentioned above, providing services in radio access networks specific to user equipments as described herein can be performed with other types of wireless communications systems.

The method 800 includes a UE 902 connecting 802 with a RAN 904, in accordance with 3GPP standards. The RAN 904 (e.g., the RAN of FIG. 3, etc.) of the 5G system 900 of FIG. 9 includes a gNB 906 (e.g., the gNB of FIGS. 5a-5c, the gNB 602 of FIG. 6, etc.). The UE's connection 802 to the RAN 904 can be a first ever connection of the UE 902 with the RAN 904 configured to provide services specific to UEs as described herein or can be a first connection of the UE 902 with the RAN 904 after the RAN 904 has been updated to be configured to provide services specific to UEs as described herein. With the UE 902 connected with the RAN 904, the RAN 904 collects or gathers 804 RAN contextual information for the UE 902 as described herein.

Also, a core network 908 (e.g., the core network 502 of FIG. 5a, etc.) communicatively coupled with the RAN 904 collects or gathers 804 CN contextual information for the UE 902 as described herein. The core network 908 of the 5G system 900 of FIG. 9 includes an AMF 910 (e.g., the AMF 604 of FIG. 6, etc.), an SMF 912, and a UPF 914.

Figure 9:
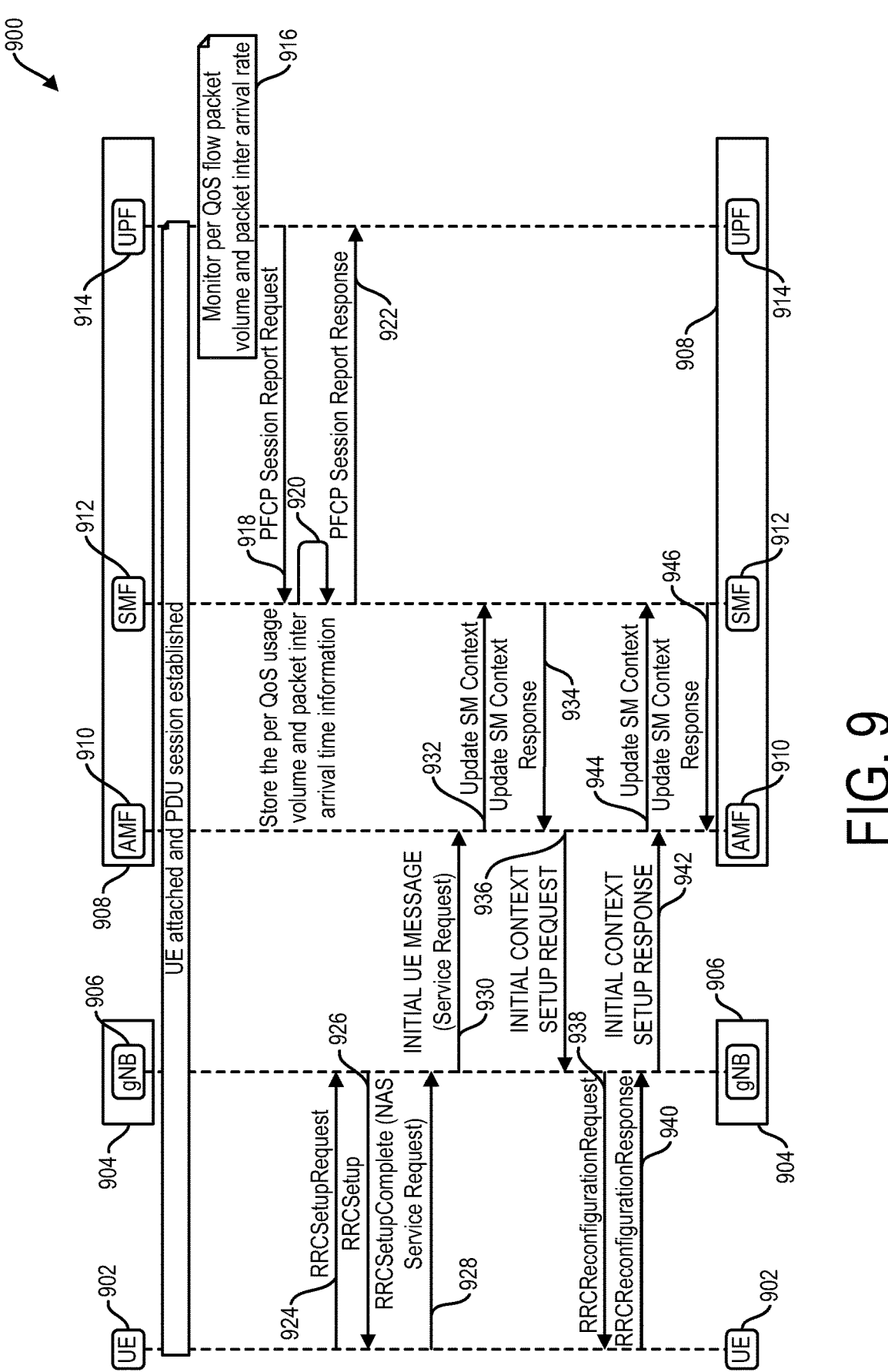
FIG. 9 illustrates an exemplary system, according to some implementations of the current subject matter.

As shown in FIG. 9, the core network 908 gathering 804 CN contextual information can include the UPF 914 monitoring per QoS flow packet volume and packet inter arrival rate for the UE 902. The UPF 916 can transmit 918 a PFCP Session Report Request to the SMF 912, in accordance with 3GPP standards except that the PFCP Session Report Request also includes the gathered 804 CN contextual information as a session report to the SMF 912. CN contextual information collected by the UPF 914 may thus be communicated to the SMF 912 using a message already transmitted from the UPF 914 to the SMF 912 in accordance with 3GPP standards. The SMF 912 stores 920 the received CN contextual information. Also, in response to receiving the PFCP Session Report Request, the SMF 912 transmits 922 a PFCP Session Report Response to the UPF 914, in accordance with 3GPP standards.

At some point during the UE's connection with the RAN 904, the RAN 904 can transmit 806 a UE CONTEXT RELEASE REQUEST message to the core network 908, e.g., when the UE 902 is to be transitioned to IDLE, in accordance with 3GPP standards. In response to receiving the UE CONTEXT RELEASE REQUEST message, the core network 908 transmits 808 a UE CONTEXT RELEASE COMMAND to the RAN 904, in accordance with 3GPP standards. In response to receiving the UE CONTEXT RELEASE COMMAND, the RAN 904 transmits 810 a UE CONTEXT RELEASE COMPLETE message to the core network 908 in accordance with 3GPP standards except that the UE CONTEXT RELEASE COMPLETE message also carries the RAN contextual information gathered 804 by the RAN 904, as described herein. The core network 908 stores 812 the received RAN contextual information, as described herein.

At some point after the UE context has been released, the UE 902 can reconnect 814 with the RAN 904. The RAN 904 receives 814 the RAN contextual information and the CN contextual information from the core network 902, which the RAN 904 may then use in providing service to the UE 902 as discussed herein.

More particularly, as shown for the implementation of FIG. 9, the connection 814 of the UE 902 with the RAN 904 includes the UE 902 transmitting 924 an RRCSetupRequest message to the RAN 904, e.g., to the gNB 904, in accordance with 3GPP standards. In response to receiving the RRCSetupRequest message, the RAN 904, e.g., the gNB 904, transmits 926 an RRCSetup message to the UE 902, in accordance with 3GPP standards. In response to receiving the RRCSetup message, the UE 902 transmits 928 an RRCSetupComplete (NAS Service Request) message to the RAN 904, e.g., the gNB 906, in accordance with 3GPP standards. In response to receiving the RRCSetupComplete (NAS Service Request) message, the RAN 904, e.g., the gNB 906, transmits 930 an INITIAL UE MESSAGE (Service Request) to the core network 908, e.g., to the AMF 910, in accordance with 3GPP standards.

In response to receiving the INITIAL UE MESSAGE (Service Request), the AMF 910 transmits 932 an Update SM Context message to the SMF 912, in accordance with 3GPP standards. In response to receiving the Update SM Context message, the SMF 912 transmits 934 an Update SM Context Response to the AMF 910, Update SM Context message, in accordance with 3GPP standards except that the Update SM Context Response also carries the RAN contextual information for the UE 902 and the CN contextual information for the UE 902. In response to receiving the Update SM Context Response, the core network 908, e.g., the AMF 910, transmits 936 an INITIAL CONTEXT SETUP REQUEST to the RAN 904, e.g., the gNB 906, in accordance with 3GPP standards except that the INITIAL CONTEXT SETUP REQUEST also carries the RAN contextual information and the CN contextual information that the AMF 910 received from the SMF 912. In other words, in addition to the INITIAL CONTEXT SETUP REQUEST carrying information, e.g., expected UE activity behavior (including expected UE activity period and expected UE idle period), expected handover (HO) interval, and expected UE mobility, as defined by 3GPP, the INITIAL CONTEXT SETUP REQUEST also carries the RAN contextual information and the CN contextual information. The RAN 904 can then use the RAN contextual information and the CN contextual information in providing service to the UE 902 as discussed herein.

In response to receiving the INITIAL CONTEXT SETUP REQUEST, the RAN 904, e.g., the gNB 906, transmits 938 an RRCReconfigurationRequest to the UE 902, in accordance with 3GPP standards. In response to receiving the RRCReconfigurationRequest, the UE 902 transmits 940 an RRCReconfigurationResponse to the RAN 904, e.g., the gNB 906, in accordance with 3GPP standards.

In response to receiving the RRCReconfigurationResponse, the RAN 904, e.g., the gNB 906, transmits 942 an INITIAL CONTEXT SETUP RESPONSE to the core network 908, e.g., to the AMF 910, in accordance with 3GPP standards.

In response to receiving the INITIAL CONTEXT SETUP RESPONSE, the AMF 910 transmits 944 an Update SM Context message to the SMF 912, in accordance with 3GPP standards. In response to receiving the Update SM Context message, the SMF 912 transmits 946 an Update SM Context message to the AMF 910.

The UE 902 can then communicate on the wireless communications system 900, in accordance with 3GPP standards, with the method 800 continuing as discussed above with the RAN gathering 804 RAN contextual information and the core network 908 gathering 804 CN contextual information.

The method 800 can be performed in relation to each UE communicatively coupled with the RAN 904. The method 800 can be performed in relation to each RAN communicatively coupled with the core network 908.

In some implementations, the current subject matter can be configured to be implemented in a system 1000, as shown in FIG. 10. The system 1000 can include one or more of a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 600. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

FIG. 11 illustrates an exemplary method 1100 for providing services in radio access networks specific to user equipments, according to some implementations of the current subject matter. The method 1100 may be performed, for example, using implementations shown in and described with respect to FIGS. 6-9.

The method 1100 includes receiving 1102, at a core network (e.g., the EPC 108 of FIGS. 1a-1c and 2, the core network 502 of FIG. 5a, the core network 908 of FIG. 9, etc.) from a RAN (e.g., the EUTRAN 102 of FIGS. 1a-1c and 2, the RAN of FIG. 3, the RAN 904 of FIG. 9, etc.), usage information (e.g., RAN contextual information) uniquely associated with a UE having a UE context. The usage information can have been gathered by the RAN. The method can also include storing 1104 the received usage information at the core network (e.g., in a memory of the core network) after the UE context has been released.

In some implementations, the current subject matter can include one or more of the following optional features.

In some implementations, the usage information can include one or more of the following parameters: Physical Downlink Control Channel (PDCCH) Control Channel Elements (CCE) allocation statistics for the UE, Block Error Rate (BLER) distribution for the UE, Modulation and Coding Scheme (MCS) distribution for the UE, uplink power allocation history based on Transmit Power Control (TPC) commands transmitted in association with the UE, Carrier Aggregation (CA) band combinations used in association with the UE, and Dual Connectivity (DC) band combinations used in association with the UE. Further, the method can further include transmitting an octet stream from the RAN to the core network with the usage information.

In some implementations, the usage information can be transmitted from the RAN to the core network in a UE CONTEXT RELEASE COMPLETE message.

In some implementations, the method can further include, after the UE context has been released, transmitting the stored usage information from the core network to the RAN. Further, the RAN can be configured to use the received usage information to fine tune UE-specific scheduling behavior and CA and DC carrier addition strategy, the RAN can be configured to use the received information in one or more of: tuning proportionate fair scheduler alpha/beta parameters, adjusting UE-specific PDCCH search space, adjusting a CCE aggregation level, adjusting an uplink power allocation to start approximately from a power level last used by the RAN for the UE, adjusting an initial MCS and/or BLER target, and adjusting a connected mode DRX configuration of the UE, and/or the core network can transmit the stored usage information to the RAN in an INITIAL CONTEXT SETUP MESSAGE associated with the UE reconnecting with the RAN.

In some implementations, the method can further include a User Plane Function (UPF) (e.g., the UPF 914 of FIG. 9, etc.) of the core network collecting per Quality of Service (QoS) flow average packet inter-arrival time information associated with the UE. Further, the method can further include the UPF transmitting the collected information to a Session Management Function (SMF) (e.g., the SMF 912 of FIG. 9, etc.) of the core network. Further, the UPF can transmit the collected information to the SMF in a Packet Forwarding Control Protocol (PFCP) Session Report Request message. Further, the method can further include the SMF transmitting the collected information to an Access and Mobility Management Function (AMF) (e.g., the AMF 604 of FIG. 6, the AMF 910 of FIG. 9, etc.) of the core network. Further, the SMF can transmit the collected information to the AMF in an Update Session Management (SM) Context Response message. Further, the method can further include the AMF transmitting the collected information and the stored usage information to the RAN. Further, the AMF can transmit the collected information and the stored usage information in an INITIAL CONTEXT SETUP MESSAGE to the RAN, and/or the AMF can also transmit one or more of the following to the RAN: per QoS flow uplink and downlink volume and per QoS flow uplink and downlink flow time.

In some implementations, the core network can store the usage information in connection with a unique identifier of the UE, and the unique identifier can be either an International Mobile Subscriber Identity (IMSI) or a Subscription Permanent Identifier (SUPI).

In some implementations, the RAN can include a base station that includes an eNodeB (e.g., the eNBs 106 of FIGS. 1*b*-2, the eNB 301 of FIG. 3, the eNB 702 of FIG. 7, etc.), and the core network can be a core network of an LTE system.

In some implementations, the RAN can include a base station that includes a gNodeB (e.g., the gNB of FIGS. 5*a*-5*c*, the gNB 602 of FIG. 6, the gNB 906 of FIG. 9, etc.), and the core network can be a core network of a 5G system or a next generation system after 5G.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving, at a core network from a radio access network (RAN), usage information uniquely associated with a user equipment (UE) having a UE context, the usage information having been gathered by the RAN;
storing the received usage information at the core network after the UE context has been released; and
after the UE context has been released, transmitting the stored usage information from the core network to the RAN, wherein the RAN is configured to use the usage information received from the core network to fine tune UE-specific scheduling behavior and carrier aggregation (CA) and dual connectivity (DC) carrier addition strategy.

2. The method of claim 1, wherein the usage information includes one or more of the following parameters: Physical Downlink Control Channel (PDCCH) Control Channel Elements (CCE) allocation statistics for the UE, Block Error Rate (BLER) distribution for the UE, Modulation and Coding Scheme (MCS) distribution for the UE, uplink power allocation history based on Transmit Power Control (TPC) commands transmitted in association with the UE, Carrier Aggregation (CA) band combinations used in association with the UE, and Dual Connectivity (DC) band combinations used in association with the UE.

3. The method of claim 1, wherein the usage information is transmitted from the RAN to the core network in a UE CONTEXT RELEASE COMPLETE message.

4. The method of claim 1, wherein the RAN is configured to use the usage information received from the core network in one or more of: tuning proportionate fair scheduler alpha/beta parameters, adjusting UE-specific Physical Downlink Control Channel (PDCCH) search space, adjusting a Control Channel Elements (CCE) aggregation level, adjusting an uplink power allocation to start approximately from a power level last used by the RAN for the UE, adjusting an initial Modulation and Coding Scheme (MCS) and/or Block Error Rate (BLER) target, and adjusting a connected mode Discontinuous Reception (DRX) configuration of the UE.

5. The method of claim 1, wherein the core network transmits the stored usage information to the RAN in an INITIAL CONTEXT SETUP MESSAGE associated with the UE reconnecting with the RAN.

6. The method of claim 1, further comprising a User Plane Function (UPF) of the core network collecting per Quality of Service (QoS) flow average packet inter-arrival time information associated with the UE.

7. The method of claim 6, further comprising the UPF transmitting the collected information to a Session Management Function (SMF) of the core network.

8. The method of claim 7, wherein the UPF transmits the collected information to the SMF in a Packet Forwarding Control Protocol (PFCP) Session Report Request message.

9. The method of claim 7, further comprising the SMF transmitting the collected information to an Access and Mobility Management Function (AMF) of the core network.

10. The method of claim 7, wherein the SMF transmits the collected information to an AMF in an Update Session Management (SM) Context Response message.

11. The method of claim 9, further comprising the AMF transmitting the collected information and the stored usage information to the RAN.

12. The method of claim 11, wherein the AMF transmits the collected information and the stored usage information in an INITIAL CONTEXT SETUP MESSAGE to the RAN.

13. The method of claim 11, wherein the AMF also transmits one or more of the following to the RAN: per QoS flow uplink and downlink volume and per QoS flow uplink and downlink flow time.

14. The method of claim 1, wherein the core network stores the usage information in connection with a unique identifier of the UE, the unique identifier being either an International Mobile Subscriber Identity (IMSI) or a Subscription Permanent Identifier (SUPI).

15. The method of claim 1, wherein the RAN includes a base station that includes an eNodeB, and the core network is a core network of an LTE system.

16. The method of claim 1, wherein the RAN includes a base station that includes a gNodeB, and the core network is a core network of a 5G system or a next generation system after 5G.

17. An apparatus, comprising:
at least one processor, and
at least one non-transitory storage media storing instructions that, when executed by the at least one processor, cause the at least one processor to perform operations comprising:
receiving, at a core network from a radio access network (RAN), usage information uniquely associated with a user equipment (UE) having a UE context, the usage information having been gathered by the RAN;
storing the received usage information at the core network after the UE context has been released; and
after the UE context has been released, transmitting the stored usage information from the core network to the RAN, wherein the RAN is configured to use the usage information received from the core network to fine tune UE-specific scheduling behavior and carrier aggregation (CA) and dual connectivity (DC) carrier addition strategy.

18. At least one non-transitory storage media storing instructions that, when executed by at least one processor, cause the at least one processor to perform operations comprising:
receiving, at a core network from a radio access network (RAN), usage information uniquely associated with a user equipment (UE) having a UE context, the usage information having been gathered by the RAN;
storing the received usage information at the core network after the UE context has been released; and
after the UE context has been released, transmitting the stored usage information from the core network to the RAN, wherein the RAN is configured to use the usage information received from the core network to fine tune UE-specific scheduling behavior and carrier aggregation (CA) and dual connectivity (DC) carrier addition strategy.

19. The method of claim 1, wherein the usage information is received at the core network from the RAN together with a temporary identifier of the UE, and is stored at the core network in association with a non-temporary identifier of the UE.

20. The method of claim 1, wherein the usage information is transmitted from the RAN to the core network in a UE CONTEXT RELEASE COMPLETE message in response to a UE context release command transmitted from the core network to the RAN, the UE context release command transmitted in response to a UE context release request received by the core network from the RAN.

* * * * *